(12) United States Patent
Zhou et al.

(10) Patent No.: US 9,571,587 B1
(45) Date of Patent: Feb. 14, 2017

(54) COORDINATING COMMUNICATION WITH A WIRELESS DEVICE

(71) Applicant: Sprint Spectrum LP, Overland Park, KS (US)

(72) Inventors: Yu Zhou, Herndon, VA (US); Pei Hou, Herndon, VA (US); Muhammad Naim, Sterling, VA (US); David McGrath, Golden, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 355 days.

(21) Appl. No.: 14/203,330

(22) Filed: Mar. 10, 2014

(51) Int. Cl.
*H04L 29/08* (2006.01)

(52) U.S. Cl.
CPC .................. *H04L 67/141* (2013.01)

(58) Field of Classification Search
CPC ...... H04L 67/141; H04L 67/14; H04L 67/142; H04L 65/1066; H04L 65/1006; H04L 69/24; H04L 47/70; H04L 47/72; H04L 47/722; H04L 47/724; H04L 47/726; H04L 47/728; H04L 47/74; H04L 47/741; H04L 47/743; H04L 47/745; H04L 47/746; H04L 47/748; H04L 47/76; H04L 47/762; H04L 47/765; H04L 47/767; H04L 47/78; H04L 47/781; H04L 47/782; H04L 47/783; H04L 47/785; H04L 47/787; H04L 47/788; H04L 47/6255; H04L 47/625; H04L 47/626; H04L 47/6265; H04L 47/6275; H04L 47/628; H04W 76/00; H04W 24/02; H04W 72/005; H04W 84/47; H04B 7/2606
See application file for complete search history.

(56) References Cited

U.S. PATENT DOCUMENTS

| | | | | |
|---|---|---|---|---|
| 9,131,494 B2 * | 9/2015 | Kim | ................. | H04W 72/0426 |
| 9,154,987 B2 * | 10/2015 | Redana | ................. | H04W 24/10 |
| 9,294,938 B2 * | 3/2016 | Bertorelle | ............. | H04W 24/02 |
| 2008/0080436 A1 * | 4/2008 | Sandhu | ............... | H04W 52/241 |
| | | | | 370/338 |
| 2011/0194483 A1 * | 8/2011 | Ji | ...................... | H04W 36/0033 |
| | | | | 370/315 |
| 2011/0228700 A1 * | 9/2011 | Mildh | .................. | H04B 7/2606 |
| | | | | 370/254 |
| 2012/0149296 A1 * | 6/2012 | Sawai | .................. | H04B 7/2606 |
| | | | | 455/7 |
| 2012/0156984 A1 * | 6/2012 | Gan | .................... | H04B 7/15542 |
| | | | | 455/7 |

* cited by examiner

*Primary Examiner* — Saket K Daftuar

(57) ABSTRACT

A communication session is established between a wireless device and a first access node, where the wireless device is located in a first coverage area of the first access node and located in a second coverage area of a second access node. A communication schedule is determined for the first access node and the second access node to communicate with the wireless device. The communication schedule can comprise a first portion and a second portion. Communication is performed between the first access node and the wireless device during the first portion, and between the second access node and the wireless device during the second portion.

10 Claims, 6 Drawing Sheets

US 9,571,587 B1

COORDINATING COMMUNICATION WITH A WIRELESS DEVICE

TECHNICAL BACKGROUND

A heterogeneous network environment can include access nodes of various size, signal transmission power, coverage area, supported frequency bands, supported radio access technologies, and the like. The deployment of smaller access nodes, such as micro nodes, pico nodes, femto nodes, and so forth, enables rapid and cost-efficient network development at lower costs than the deployment of macro access nodes. In addition, smaller access nodes can extend the coverage and throughput of a communication network by serving as relay access nodes for a macro node. Thus, due to their relatively compact physical characteristics, lower power requirements, rapid deployability, relay access nodes can provide a network provider with more rapid and flexible network expansion options than traditional macro access nodes.

OVERVIEW

In operation, a communication session is established between a wireless device and a first access node, where the wireless device is located in a first coverage area of the first access node and located in a second coverage area of a second access node. A communication schedule is determined for the first access node and the second access node to communicate with the wireless device. The communication schedule can comprise a first portion and a second portion. Communication is conducted between the first access node and the wireless device during the first portion, and between the second access node and the wireless device during the second portion.

In embodiments, another access node can provide backhaul communication links to the first and second access nodes. Accordingly, in an embodiment, communication is conducted, during the first portion of the communication schedule, between the first access node and the wireless device, and between the second access node and a third access node, and communication is conducted, during the second portion, between the second access node and the wireless device, and between the first access node and the third access node, where the first access node is in communication with the third access node over a first backhaul communication link, the second access node is in communication with the third access node over a second backhaul communication link, and the third access node is in communication with a communication network over a third backhaul communication link.

Further, in an embodiment, communication is conducted, during the first portion, between the first access node and the wireless device, and between the second access node and a fourth access node, and communication is conducted, during the second portion, between the second access node and the wireless device, and between the first access node and a third access node, where the first access node is in communication with the third access node over a first backhaul communication link, the second access node is in communication with the fourth access node over a second backhaul communication link, and the third access node and the fourth access node are each in communication with a network element over a third backhaul communication link and a fourth backhaul communication link, respectively.

DETAILED DESCRIPTION

Figure 1:
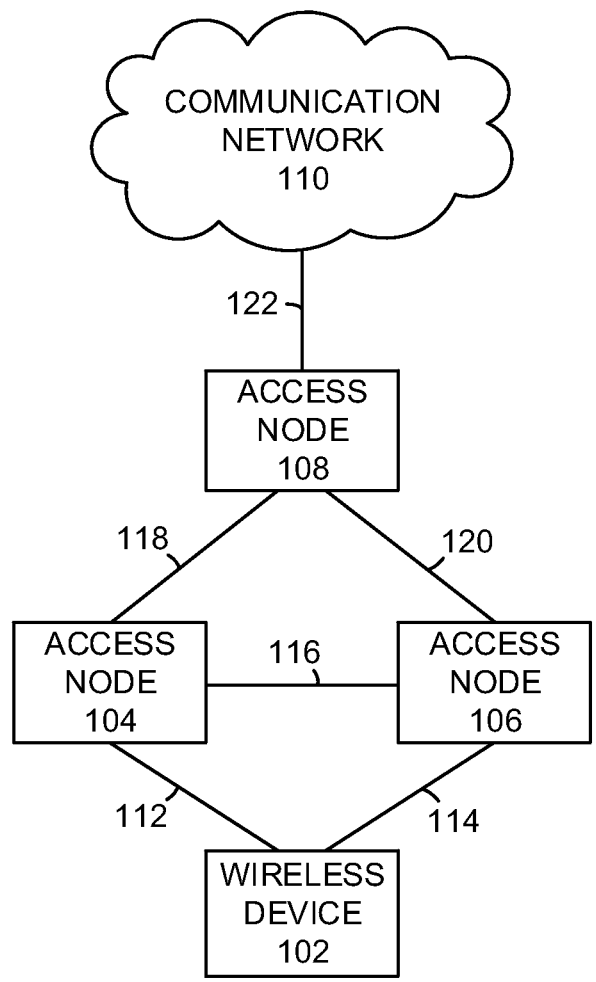
FIG. 1 illustrates an exemplary communication system to coordinate communication with a wireless device.

FIG. 1 illustrates an exemplary communication system 100 to coordinate communication with a wireless device comprising wireless device 102, access node 104, access node 106, access node 108, and communication network 110. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 112, and with access node 106 over communication link 114.

Access nodes 104, 106, and 108 are each a network node capable of providing wireless communications to wireless device 102, and can comprise, for example, a base transceiver station, a radio base station, an eNodeB device, or an enhanced eNodeB device. Access nodes 104, 106, and 108 can also vary in coverage area size, signal transmission power, and the like, and each access node can comprise a macro node, a micro node, a pico node, a femto node, and so forth. Access node 104 can communicate with access node 108 over communication link 118, and access node 106 can communicate with access node 108 over communication link 120. Access nodes 104 and access nodes 106 may also communicate with each other over communication link 116, however, in embodiments communication link 116 may not be present (e.g., a physical connection may not be present, or a logical communication link may not be established between access nodes 104 and 106 over an existing physical connection). Access node 108 is in communication with communication network 110 over communication link 122. Access nodes 104 and 106 can each comprise a coverage area in which a signal from an access node is detectable by a wireless device at or above a threshold signal level. Wireless device 102 can be located within a coverage area of access node 104 and a coverage area of access node 106.

Communication network 110 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other data, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, 118, 120, and 122 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106, access node 108, and communication network 110 which are omitted for clarity, including additional processing nodes, routers, gateways, and physical and/or wireless data links for carrying data among the various network elements.

Access nodes 104 and 106 can comprise relay access nodes. Relay access nodes can provide increased coverage area and capacity of a communication network. Each of access nodes 104 and 106 can communicate with access node 108, which can function as a donor access node, which can provide wireless communication resources to each of access nodes 104 and 106 as well as to wireless devices in communication directly with access node 108 (not illustrated). Access nodes 104 and 106 can communicate with communication network 110 through access node 108, thus communication links 118 and 120 can be considered backhaul communication links of relay access nodes 104 and 106, respectively, provided by donor access node 108.

When access nodes 104 and 106 use an in-band relay method, access nodes 104 and 106 can each use the same frequency band for communication with a wireless device and for communication with access node 108. For example, access node 104 can use the same frequency band for communication with wireless device 102 over communication link 112 (a relay link) and for communication with access node 108 over communication link 118 (a backhaul link). Similarly, access node 106 can use the same frequency band over communication links 114 and 120. An access node using the in-band relay method typically cannot simultaneously communicate over both the relay link and the backhaul link due to interference over the frequency band. While a partitioning scheme can be used to mitigate in-band interference, the reduction of the simultaneous use of the relay and backhaul communication links can reduce network performance and quality of experience provided to a wireless device.

In operation, a communication session is established between wireless device 102 and first access node 104. Wireless device 102 can be located in a first coverage area of first access node 104, and in a second coverage area of second access node 106, such that both access nodes 104 and 106 can function as relay access nodes to provide wireless communications to wireless device 102. A communication schedule is determined for first access node 104 and second access node 106 to communicate with wireless device 102, wherein the communication schedule comprises a first portion and a second portion. Communication is performed between first access node 104 and wireless device 102 during the first portion of the communication schedule, and communication is performed between second access node 106 and wireless device 102 during the second portion of the communication schedule.

Figure 2:
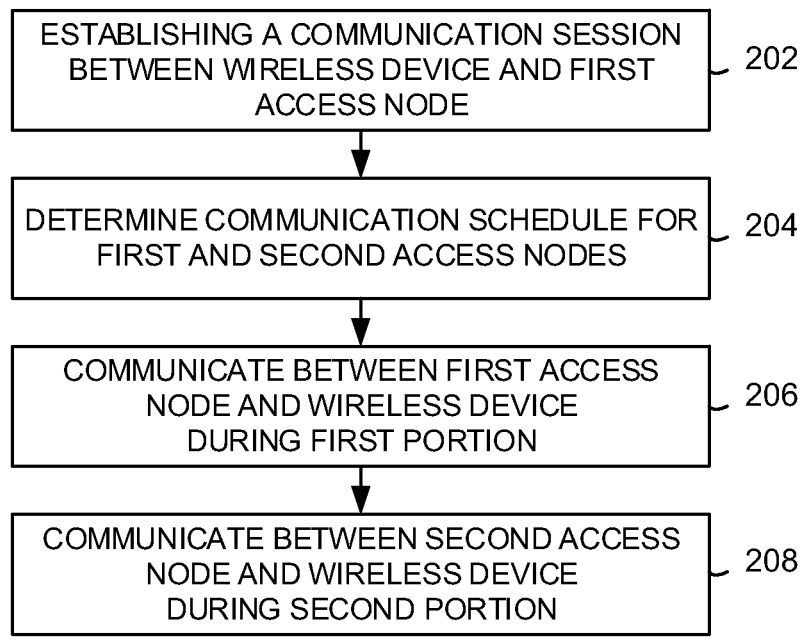
FIG. 2 illustrates an exemplary method of coordinating communication with a wireless device.

FIG. 2 illustrates an exemplary method of coordinating communication with a wireless device. In operation 202, a communication session is established between a wireless device and a first access node, wherein the wireless device is located in a first coverage area of the first access node and located in a second coverage area of a second access node. For example, wireless device 102 can be located within a coverage area of access node 104 and within a coverage area of access node 106. In an embodiment, one of access node 104 and 106 can be selected to serve as a primary relay access node for wireless device 102. Signal levels received at wireless device 102 from each of access nodes 104 and 106 can be used to select the primary relay access node. A signal level can comprise a reference signal receive power (RSRP), a received signal strength indication (RSSI), a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SNIR), a signal to quantization noise ratio (SQNR), and the like. The signal level can also comprise a reference signal receive quality (RSRQ), a channel quality indicator (CQI), or another measurement of signal quality.

Based on the signal levels received at wireless device 102, one of access nodes 104 and 106 can be selected as the primary relay access node for wireless device 102, and a communication session can be established between wireless device and the selected primary relay access node (e.g., access node 104). The wireless device can then provide an indication to the selected primary access node of an identifier of the secondary relay access node (e.g., access node 106). For example, wireless device 102 can provide an indicator, such as a physical cell identifier (PCI), a cell global identifier (CGI), a EUTRAN cell global identifier (ECGI), and the like, of access node 106 to access node 104 over communication link 112 (e.g., over a control channel, a bearer channel, and so forth).

When the primary and secondary relay access nodes are selected and/or identified, a communication schedule is determined for the first access node and the second access node to communicate with the wireless device, wherein the communication schedule comprises a first portion and a second portion (operation 204). The first portion and the second portion of the communication schedule typically do not overlap in time. Thus, communications during the first portion will not overlap or collide with communications during the second portion. Access nodes 104 and 106 can negotiate the communication schedule with each other over communication link 116. Alternatively, or additionally, the negotiation of the communication schedule can be coordinated by access node 108 functioning as a donor access node. In an embodiment, the first portion and the second portion of the communication schedule can each comprise one or more subframes during which communication is performed between wireless device 102 and one of access nodes 104 and 106. For example, communication between a wireless device and an access node can be structured according to frames generally comprising two or more subframes over a predetermined period of time. When the communication schedule is negotiated, one or more subframes can be allocated to each of the first portion and the second portion of the communication schedule. The communication schedule can be negotiated for uplink communications from the wireless device to the access nodes, for downlink communications from the access nodes to the wireless device, or for both uplink and downlink communications. The communication schedule is then provided to access node 104, access node 106, and wireless device 102.

When the communication schedule is provided to access node 104, access node 106, and wireless device 102, then communication proceeds according to the communication schedule, between the first access node and the wireless device during the first portion (operation 206), and between the second access node and the wireless device during the second portion (operation 208). In an embodiment, communication between the relay access nodes and the donor access node is also performed according to the communication schedule. For example, during the first portion of the communication schedule, communication can be performed between access node 104 and wireless device 102 over communication link 112, and between access node 106 and access node 108 over communication link 120. Then, during the second portion, communication can be performed between access node 106 and wireless device 102 over communication link 114, and between access node 104 and access node 108 over communication link 118.

Figure 3:
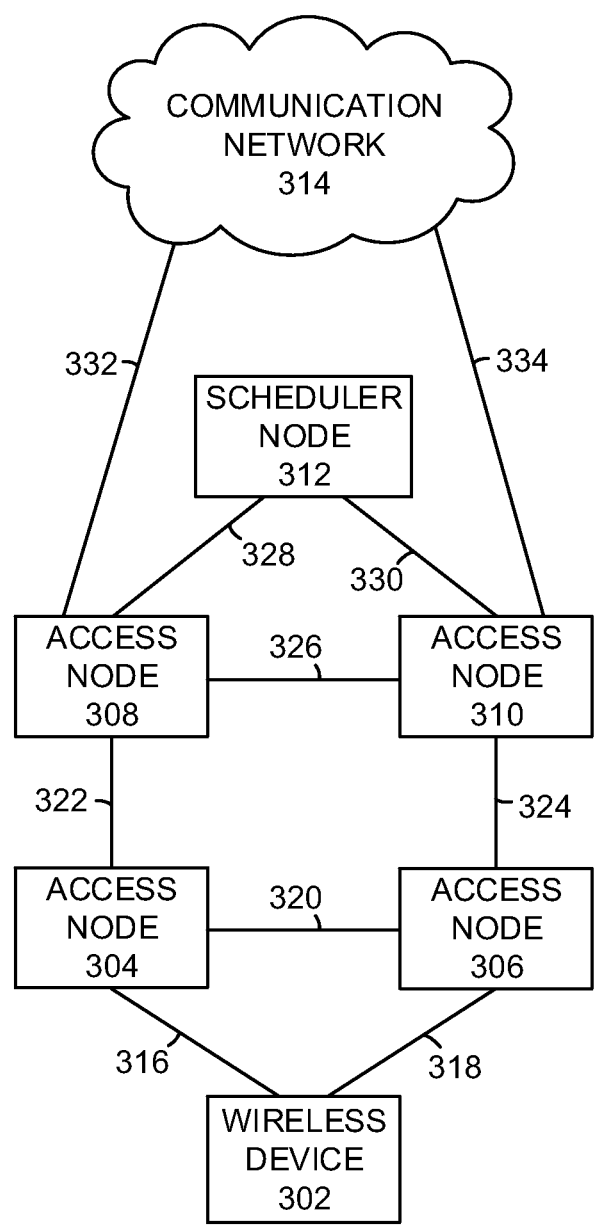
FIG. 3 illustrates another exemplary communication system to coordinate communication with a wireless device.

FIG. 3 illustrates another exemplary communication system 300 to coordinate communication with a wireless device comprising wireless device 302, access nodes 304, 306, 308, and 310, scheduler node 312, and communication network 314. Examples of wireless device 302 can comprise a cell phone, a smart phone, a computing platform such as a laptop, palmtop, or tablet, a personal digital assistant, or an internet access device, including combinations thereof. Wireless device 302 can communicate with access node 304 over communication link 316, and with access node 306 over communication link 318.

Access nodes 304, 306, 308 and 310 are each is a network node capable of providing wireless communications to wireless device 302, and can comprise, for example, a base transceiver station, a radio base station, an eNodeB device, or an enhanced eNodeB device. Access nodes 304, 306, 308, and 310 can also vary in coverage area size, signal transmission power, and the like, and each access node can comprise a macro node, a micro node, a pico node, a femto node, and so forth. Access node 304 can communicate with access node 308 over communication link 322, and access node 306 can communicate with access node 310 over communication link 324. Access nodes 304 and 306 may also communicate with each other over communication link 320, if communication link 320 is present. Access node 308 is in communication with scheduler node 312 over communication link 328, and with communication network 314 over communication link 332. Access node 310 is in communication with scheduler node 312 over communication link 330, and with communication network 314 over communication link 334. Access nodes 308 and 310 may also communicate with each other over communication link 326, if communication link 326 is present. Access nodes 304 and 306 can each comprise a coverage area in which a signal from an access node is detectable by a wireless device at or above a threshold signal level. Wireless device 302 can be located within a coverage area of access node 304 and a coverage area of access node 306.

Scheduler node 312 is a network element which can comprise a processor and associated circuitry to execute or direct the execution of computer-readable instructions, and can be configured to coordinate communication with a wireless device. Scheduler node 312 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Scheduler node 312 can receive instructions and other input at a user interface. Examples of scheduler node 312 can include a mobile switching center (MSC), a dispatch call controller (DCC), a mobility management entity (MME), access service network gateway (ASN-GW), a packet data network gateway (P-GW), a serving gateway (S-GW), a mobile switching controller (MSC), a packet data serving node (PDSN), subscriber profile system (SPS), a home subscriber server (HSS), an authentication, authorization, and accounting node (AAA), or another network element of communication system 300.

Communication network 314 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other data, for example, to support communications by a wireless device such as wireless device 302. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 314 may also comprise a wireless network, including base stations, wireless communication nodes, telephony switches, internet routers, network gateways, computer systems, communication links, or some other type of communication equipment, and combinations thereof.

Communication links 316, 318, 320, 322, 324, 326, 328, 330, 332, and 334 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 304, 306, 308, and 310, scheduler node 312, and communication network 314 which are omitted for clarity, including additional processing nodes, routers, gateways, and physical and/or wireless data links for carrying data among the various network elements.

Access nodes 304 and 306 can comprise relay access nodes. Relay access nodes can provide increased coverage area and capacity of a communication network. Access node 304 can communicate with access node 308, and access node 306 can communicate with access node 310, where each of access nodes 308 and 310 can function as a donor access node for access nodes 304 and 306, respectively. A donor access node which can provide wireless communication resources to a relay access node, as well as to wireless devices in communication directly with the access node (e.g., directly in communication with access nodes 308 or 310, not illustrated). Access nodes 304 and 306 can communicate with communication network 314 through access nodes 308 and 310, respectively. Communication links 322 and 324 can be considered backhaul communication links of relay access nodes 304 and 306, respectively, provided by donor access nodes 308 and 310.

Figure 4:
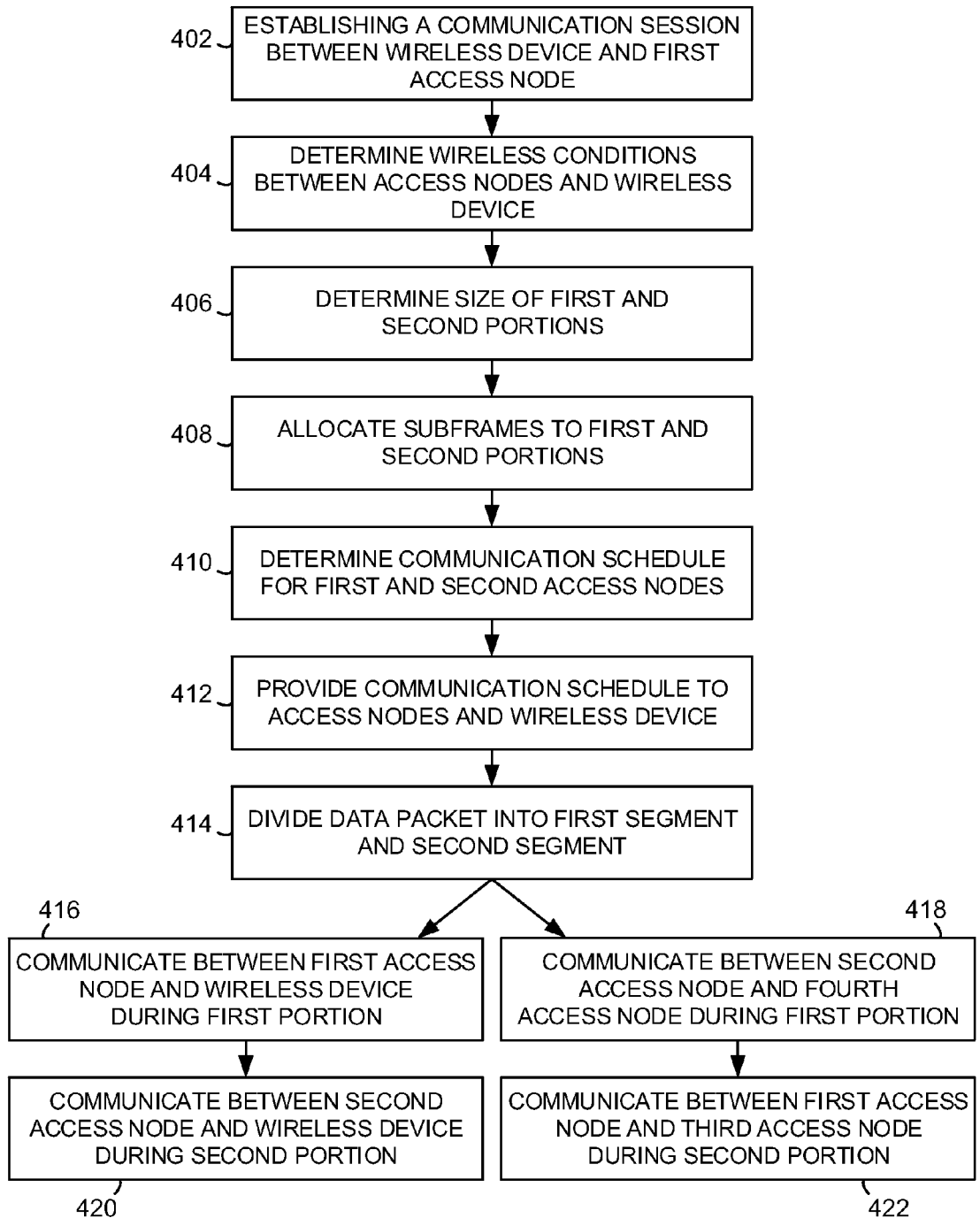
FIG. 4 illustrates another exemplary method of coordinating communication with a wireless device.

FIG. 4 illustrates another exemplary method of coordinating communication with a wireless device. In operation 402, a communication session is established between a wireless device and a first access node, wherein the wireless device is located in a first coverage area of the first access node and located in a second coverage area of a second access node. For example, wireless device 302 can be located within a coverage area of access node 304 and within a coverage area of access node 306. In an embodiment, one of access node 304 and 306 can be selected to serve as a primary relay access node for wireless device 302. Signal levels received at wireless device 302 from each of access nodes 304 and 306 can be used to select the primary relay access node. A signal level can comprise a reference signal receive power (RSRP), a received signal strength indication (RSSI), a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SNIR), a signal to quantization noise ratio (SQNR), and the like. The signal level can also comprise a reference signal receive quality (RSRQ), a channel quality indicator (CQI), or another measurement of signal quality.

Based on the signal levels received at wireless device 302, one of access nodes 304 and 306 can be selected as the primary relay access node for wireless device 302, and a communication session can be established between wireless device and the selected primary relay access node (e.g., access node 304). The wireless device can then provide an indication to the selected primary access node of an identifier of the secondary relay access node (e.g., access node 306). For example, wireless device 302 can provide an indicator, such as a physical cell identifier (PCI), a cell global identifier (CGI), a EUTRAN cell global identifier (ECGI), and the like, of access node 306 to access node 304 over communication link 316 (e.g., over a control channel, a bearer channel, and so forth).

When the primary and secondary relay access nodes are selected and/or identified, first wireless communication conditions are determined between the wireless device and the first access node and second wireless communication conditions are determined between the wireless device and the second access node (operation 404). The wireless communication conditions can be determined based on the signal levels from access nodes 304 and 306 described above. The wireless communication conditions can also be determined based on a utilization or requested utilization of communication link resources, for example, a number of wireless communication sessions established at each access node, an amount of data sent to or from the access nodes to other wireless devices (not illustrated), a number of physical resource blocks or other wireless communication link resource utilized by other wireless devices, a requested amount of data to be sent to or from the wireless device (as may be determined from a buffer status report or similar request for wireless communication link resources), an amount of data buffered for transmission to or from the access nodes, and the like, including combinations thereof.

Figure 5:
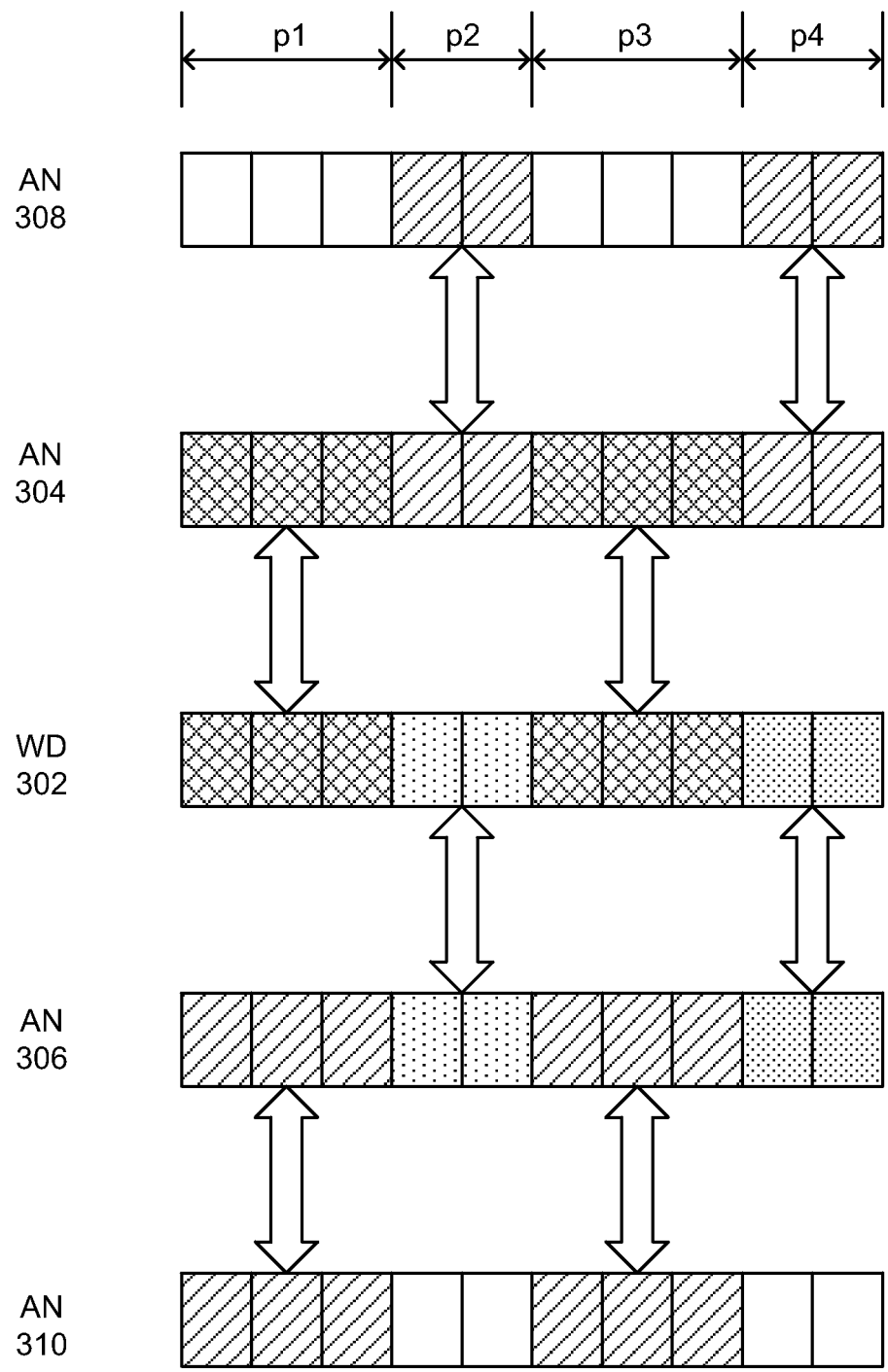
FIG. 5 illustrates another exemplary method of coordinating communication with a wireless device.

Based on the determined first and second wireless communication conditions, a size of the first portion and a size of the second portion is determined (operation 406). The first portion and the second portion can be of equal size or of different sizes, depending on the first and second wireless communication conditions. For example, when wireless communication conditions between wireless device 302 and access node 304 are superior to wireless communication conditions between wireless device 302 and access node 306, the first portion of the communication schedule can be larger than the second portion of the communication schedule. Referring to FIG. 5, a first portion of a communication schedule (during period p1) can be larger than a second portion of a communication schedule (during period p2). The first portion and the second portion can comprise at least one subframe.

Returning to FIG. 4, when the size of the first portion and the second portion is determined, subframes are allocated to the first and second portions (operation 408). As illustrated in FIG. 5, the first portion comprises three allocated subframes and the second portion comprises two allocated subframes. It will be appreciated that the illustration of subframes in each of the first portion and the second portion in FIG. 5 is merely exemplary, and in operation portion size may vary. In an embodiment, at least one first subframe is allocated to the first portion based on the first wireless communication conditions, and at least one second subframe is allocated to the second portion based on the second wireless communication conditions. The subframes may comprise uplink subframes for communication from the wireless device to the relay access nodes, or the subframes may comprise downlink subframes for communication from the access nodes to the wireless device. Thus, the first portion can comprise at least one first uplink subframe to communicate from the wireless device to the first access node, and the second subframe can comprise at least one second uplink subframe to communicate from the wireless device to the second access node. Further, the first portion can comprise at least one first downlink subframe to communicate from first access node to the wireless device, and the second subframe can comprise at least one second downlink subframe to communicate from the second access node to the wireless device.

Next, a communication schedule is determined for the first access node and the second access node to communicate with the wireless device, wherein the communication schedule comprises a first portion and a second portion (operation 410). The first portion and the second portion of the communication schedule typically do not overlap in time. Thus, communications during the first portion will not overlap or collide with communications during the second portion. Access nodes 304 and 306 can negotiate the communication schedule with each other over communication link 320. Alternatively, or additionally, the negotiation of the communication schedule can be coordinated by access nodes 308 and 310 functioning as donor access nodes for access nodes 304 and 306, respectively. Further alternatively, or additionally, the negotiation of the communication schedule can be coordinated by scheduler node 312.

The communication schedule is then provided to access node 304, access node 306, and wireless device 302 (operation 412). In an embodiment, a data packet is divided into a first segment and a second segment (operation 414) to communicate the segments between the wireless device and the access nodes. The first segment is communicated between the wireless device and the first access node, and the second segment is communicated between the wireless device and the second access node according to the communication schedule, as further described below.

When the communication schedule is provided to access node 304, access node 306, and wireless device 302, communication proceeds according to the communication schedule, between the first access node and the wireless device during the first portion (operation 416), and between the second access node and the wireless device during the second portion (420). For example, referring to FIG. 5, during a first portion (period p1) wireless device 302 and access node 304 communicate, and during a second portion (period p2) wireless device 302 and access node 306 communicate. The communication schedule can repeat periodically, so that during a next first portion (period p3) wireless device 302 and access node 304 communicate, and during a next second portion (period p4) wireless device 302 and access node 306 communicate.

In an embodiment, communication between the relay access nodes and the donor access node is also performed according to the communication schedule. For example, during the first portion (period p1) of the communication schedule, communication can be performed between access node 306 and access node 310 over communication link 324 (operation 418). Then, during the second portion (period p2), communication can be performed between access node 304 and access node 308 over communication link 322 (operation 422). Thus, communication can be performed, during the first portion, between the first access node and the wireless device, and between the second access node and a fourth access node, and communication can be performed communicating, during the second portion, between the second access node and the wireless device, and between the first access node and a third access node. Accordingly, the first access node (e.g., access node 304) can be in communication with the third access node (e.g., access node 308) over a first backhaul communication link, the second access node (e.g., access node 306) can be in communication with the fourth access node (e.g., access node 310) over a second backhaul communication link, and the third access node and the fourth access node are each in communication with a network element (e.g., scheduler node 312) over a third backhaul communication link (e.g., communication link 328) and a fourth backhaul communication link (e.g., communication link 330), respectively.

Figure 6:
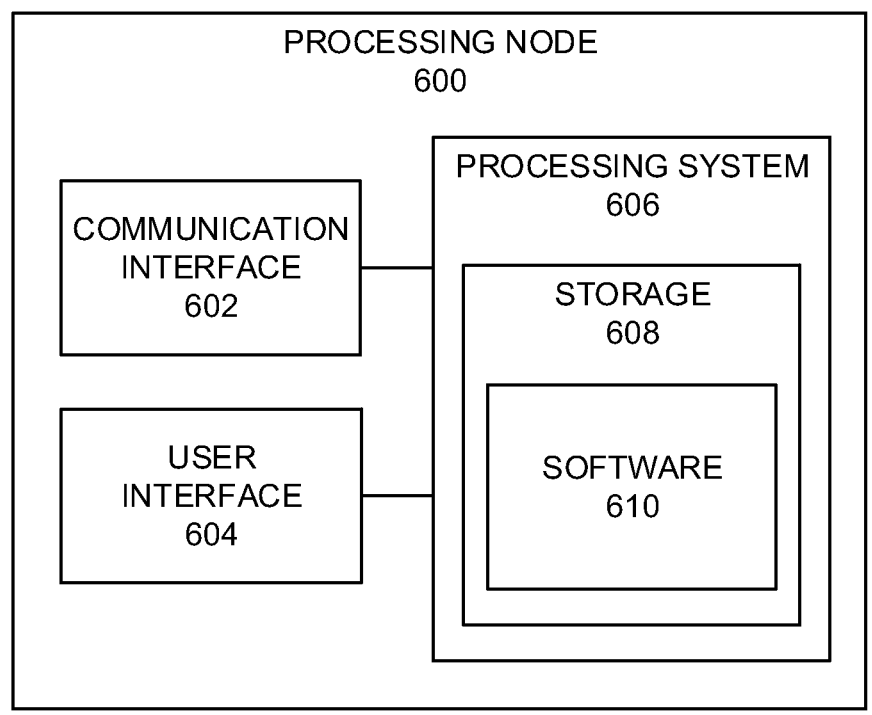
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to coordinate communication with a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 104, 106, and 108, access nodes 304, 306, 308, and 310, and scheduler node 312. Processing node 600 can also be an adjunct or component of a network element, such as an element of access nodes 104, 106, and 108, access nodes 304, 306, 308, and 310, and scheduler node 312. Processing node 600 can also be another network element in a communication system. Further, the functionality of processing node 600 can be distributed over two or more network elements of a communication system, including any of the foregoing.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of coordinating communication with a wireless device, comprising:
    establishing, by a processor, a communication session between a wireless device and a first access node, wherein the wireless device is located in a first coverage area of the first access node and located in a second coverage area of a second access node;
    determining, by the processor, a communication schedule for the first access node and the second access node to communicate with the wireless device, wherein the communication schedule comprises a first portion and a second portion, wherein the first portion comprises at least one of a first uplink subframe or a first downlink subframe to communicate between the wireless device and the first access node, and wherein the second portion comprises at least one of a second uplink subframe or a second downlink subframe to communicate between the wireless device and the second access node;
    dividing, by the processor, a data packet into a first segment and a second segment; and
    communicating, by the processor, the first segment between the first access node and the wireless device during the first portion, and communicating the second segment between the second access node and the wireless device during the second portion.

2. The method of claim 1, further comprising:
    determining, by the processor, first wireless communication conditions between the wireless device and the first access node and second wireless communication conditions between the wireless device and the second access node; and
    determining, by the processor, a size of the first portion and the second portion based on the determined first and second wireless communication conditions.

3. The method of claim 1, further comprising:
    determining, by the processor, first wireless communication conditions between the wireless device and the first access node and second wireless communication conditions between the wireless device and the second access node; and
    allocating, by the processor, the at least one of the first uplink subframe or the first downlink subframe to the first portion based on the first wireless communication conditions, and allocating the at least one of the second uplink subframe or the second downlink subframe to the second portion based on the second wireless communication conditions.

4. The method of claim 1, further comprising:
    communicating, during the first portion, between the first access node and the wireless device, and between the second access node and a third access node; and
    communicating, during the second portion, between the second access node and the wireless device, and between the first access node and the third access node,
    wherein the first access node is in communication with the third access node over a first backhaul communication link, the second access node is in communication with the third access node over a second backhaul communication link, and the third access node is in communication with a communication network over a third backhaul communication link.

5. The method of claim 1, further comprising:
    communicating, during the first portion, between the first access node and the wireless device, and between the second access node and a fourth access node; and
    communicating, during the second portion, between the second access node and the wireless device, and between the first access node and a third access node,
    wherein the first access node is in communication with the third access node over a first backhaul communication link, the second access node is in communication with the fourth access node over a second backhaul communication link, and the third access node and the fourth access node are each in communication with a network element over a third backhaul communication link and a fourth backhaul communication link, respectively.

6. A system for coordinating communication with a wireless device, comprising:
    a processing node; and
    a processor coupled to the processing node, the processor for configuring the processing node to:
        establish a communication session between a wireless device and a first access node, wherein the wireless device is located in a first coverage area of the first access node and located in a second coverage area of a second access node;
        determine a communication schedule for the first access node and the second access node to communicate with the wireless device, wherein the communication schedule comprises a first portion and a second portion, wherein the first portion comprises at least one of a first uplink subframe or a first downlink subframe to communicate between the wireless device and the first access node, and wherein the second portion comprises at least one of a second uplink subframe or a second downlink subframe to communicate between the wireless device and the second access node;
        divide a data packet into a first segment and a second segment; and
        communicate the first segment between the first access node and the wireless device during the first portion, and communicate the second segment between the second access node and the wireless device during the second portion.

7. The system of claim 6, wherein the processing node is further configured to:
    determine first wireless communication conditions between the wireless device and the first access node and second wireless communication conditions between the wireless device and the second access node; and
    determine a size of the first portion and the second portion based on the determined first and second wireless communication conditions.

8. The system of claim 6, wherein the processing node is further configured to:
    determine first wireless communication conditions between the wireless device and the first access node and second wireless communication conditions between the wireless device and the second access node; and allocate the at least one of the first uplink subframe or the first downlink subframe to the first portion based on the first wireless communication conditions, and allocate the at least one of the second uplink subframe or the second downlink subframe to the second portion based on the second wireless communication conditions.

9. The system of claim 6, wherein the processing node is further configured to:

communicate, during the first portion, between the first access node and the wireless device, and between the second access node and a third access node; and communicate, during the second portion, between the second access node and the wireless device, and between the first access node and the third access node, wherein the first access node is in communication with the third access node over a first backhaul communication link, the second access node is in communication with the third access node over a second backhaul communication link, and the third access node is in communication with a communication network over a third backhaul communication link.

10. The system of claim 6, wherein the processing node is further configured to:

communicate, during the first portion, between the first access node and the wireless device, and between the second access node and a fourth access node; and communicate, during the second portion, between the second access node and the wireless device, and between the first access node and a third access node, wherein the first access node is in communication with the third access node over a first backhaul communication link, the second access node is in communication with the fourth access node over a second backhaul communication link, and the third access node and the fourth access node are each in communication with a network element over a third backhaul communication link and a fourth backhaul communication link, respectively.

* * * * *